United States Patent [19]

Muzzarelli

[11] 4,448,116
[45] May 15, 1984

[54] APPARATUS FOR THE DRY SALTING OF CURD FOR CHEESE PRODUCTION

[76] Inventor: Gabriele Muzzarelli, Via Marzabotto, 116-Modena 41100, Italy

[21] Appl. No.: 376,548

[22] Filed: May 7, 1982

[30] Foreign Application Priority Data

Jun. 23, 1981 [IT] Italy ................................ 22513 A/81

[51] Int. Cl.³ ...................... A01J 25/00; A23C 19/064
[52] U.S. Cl. ......................................... 99/460; 99/452; 99/494; 366/100; 366/345
[58] Field of Search ................. 99/348, 494, 452, 460, 99/464, 466, 516, 535, 532, 533, 450.1–450.8; 118/24, 25, 16, 18, 30; 222/55; 366/76, 100, 342–345, 349; 426/519, 582

[56] References Cited

U.S. PATENT DOCUMENTS

| 1,394,221 | 10/1921 | Sapper | 99/494 X |
| 3,757,833 | 9/1973 | Dugger et al. | 99/494 X |
| 4,197,794 | 4/1980 | Raque et al. | 99/494 X |

FOREIGN PATENT DOCUMENTS 2237569 2/1975 France ................................ 99/494

Primary Examiner—Timothy F. Simone
Attorney, Agent, or Firm—Steinberg & Raskin

[57] ABSTRACT

Apparatus for the dry salting of plastic or pliable curd for cheese production comprises a hopper for the salt, dispensing means at the hopper outlet for sprinkling the salt onto the plastic curd, a comb member disposed downstream of the dispensing means and cooperating therewith, and means for operating the comb in such a manner that it penetrates into the curd in order to introduce the salt uniformly therein.

9 Claims, 3 Drawing Figures

APPARATUS FOR THE DRY SALTING OF CURD FOR CHEESE PRODUCTION

BACKGROUND OF THE INVENTION

This invention relates to apparatus for the dry salting of curd while in its pliable or plastic state for cheese production.

It is well known that cheeses in general are salted, and the salting operation is carried out on the final product by various systems, of which salting in brine and dry salting by sprinkling represent specific examples.

Salting in brine requires times which can be as long as thirty days, with the consequent drawback of having to tie up considerable capital for long periods of time. In addition, the brine can be a source of contamination, and can remove from the final product useful components (for example, fats) which if recovered are also salted and thus cannot be used. The starting material therefore undergoes an unjustifiable weight loss, with obvious serious detriment to production.

Dry salting by sprinkling is carried out during the curing stage while under storage, and this also suffers from significant drawbacks as it involves considerable labour costs, it being necessary to frequently handle and turn over whole cheeses which, in certain cases, can weigh many kilograms. In addition, their handling requires large storage spaces as the whole cheeses must be easily reached by the operator.

SUMMARY OF THE INVENTION

The object of the present invention is to provide an apparatus which allows uniform metered dry salting of the curd while in its pliable state without the aforesaid drawbacks occurring, the salting being carried out in an original manner after stretching the curd, but before its moulding.

According to the invention, the apparatus is characterised by comprising a channel along which the pliable curd moves, a hopper for containing the salt, said hopper possessing a discharge aperture, dispensing means disposed in said discharge aperture to feed metered quantities of salt to the pliable or plastic curd which moves in said channel, and a driven comb member disposed downstream of said dispensing means such as to penetrate into the plastic curd which moves in said channel and to uniformly introduce the salt fed to said plastic curd.

According to an important aspect of the invention, the dispensing means comprise a cylinder rotatable about its axis and comprising on its periphery a plurality of blind bores into which the salt penetrates, and an air jet which strikes said cylinder in a given position such as to ensure that the salt emerges from the bores and thus becomes distributed over the plastic curd.

DETAILED DESCRIPTION OF THE DRAWINGS

A preferred embodiment is illustrated on the accompanying drawing, in which.

DESCRIPTION OF THE PREFERRED EMBODIMENT

Figure 1:
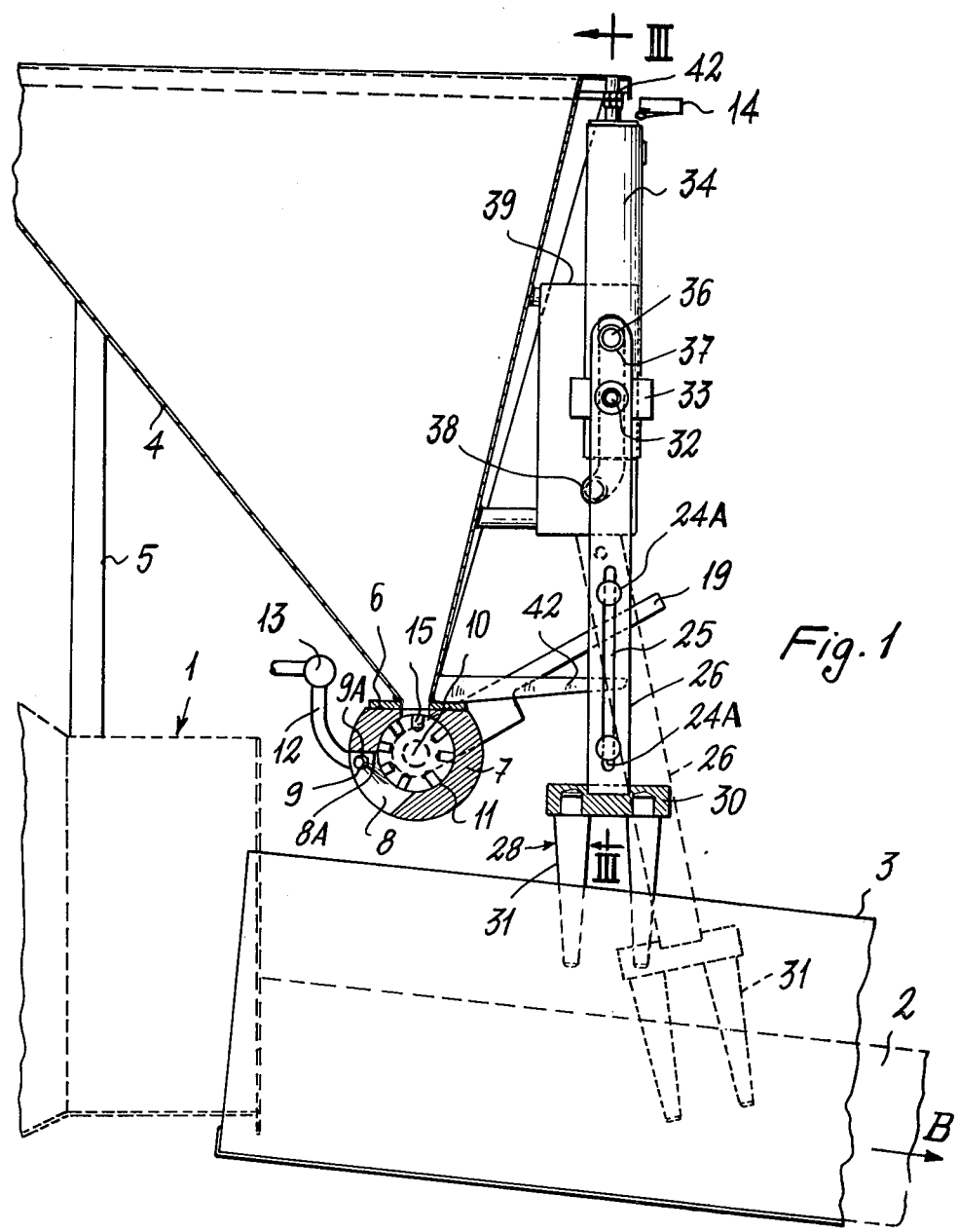
FIG. 1 is a side view of apparatus according to the invention, with the comb member shown in its rest position and in its position of maximum excursion.

In the figures, the reference numeral 1 indicates the outlet port of any machine for the production of plastic or pliable curd 2 starting for example from a normal curd. The machine can be of the type described in the already published Italian patent application No. 21937 A/79, to which reference should be made for further details. The plastic curd 2 passes from the port 1 to an upperly open inclined channel 3 which conveys the curd in a stream in a downstream direction, the curd stream having an upwardly facing free surface, to further machines, for example to a machine which divides the plastic curd into pieces and imparts a given shape to these pieces. This machine or others which further process the plastic curd do not form the subject matter of the present patent applications, and are therefore not described.

In order to salt the plastic curd in such a manner that the salting is as uniform as possible, the apparatus according to the invention is provided at the outlet of the port 1 above the inclined channel 3, and comprises a hopper 4 containing the salt in powdered form, i.e. finely ground, and supported by any known framework, of which an upright 5 can be seen. To the hopper outlet (at which a suitable surrounding flange 6 is provided) there is fixed to said flange a substantially cylindrical member 7 having a peripheral interruption or aperture 8 which extends through a certain angle over almost the entire length of the member with the exception of two short end portions. The aperture 8 is directed downwards and towards the port 1. A tube 9 extends along the upper side 8A of the aperture 8 over the entire length thereof, and is provided with a set of holes or nozzles 9A directed towards a cylindrical member 10 disposed in the axial bore 11 of the member 7.

The tube 9 is connected by the conduit 12 to a source of compressed air (not shown) by way of a solenoid valve 13 operated by a microswitch 14, which will be described hereinafter. The air jets leaving the tube 9 cause the salt to emerge from the blind bores 15 which are present in a considerable number over the entire periphery of the member 10, and to become distributed over the underlying plastic curd 2 at a first region along the path of movement of the curd stream in the channel 3.

The member 10, which is rotatably supported in the member 7, comprises at one end a stop shoulde 16 which limits its axial movement. The other end or cylindrical member 10 projects from the member 7 and comprises sawtoothed toothing 17 forming a ratchet and a short portion of smaller diameter 18. A lever 19 is rotatably mounted on the portion 18. The lever 19 is kept in situ by a ring 20 mounted on the portion 18, and by a split pin 21 inserted into a diametrical bore present at the end of said portion. The lever 19 carries an oscillating pawl 22 loaded by a spring 23 which urges the pawl into engagement with the toothing 17. It is apparent that a rotation of the lever in the direction of the arrow A of FIG. 2 causes an angular rotational movement of the member 10 and thus the transfer of a given quantity of salt from the outlet of the hopper 4 to the discharge aperture 8.

The lever 19 is controlled by threaded pins 24A which can be fixed along the slot 25 in an arm 26. By varying the position of the pins 24A, the angular excursion of the member 10 and thus the quantity of salt fed on to the plastic curd can be varied.

The arm 26 and another parallel arm 27 support a comb member 28, to which both arms are fixed by screw means 29 through their lower bend ends. The comb member 28 is situated over a second region along the path of movement of the curd stream which is downstream of the first region onto which the salt is dispensed. In this example, the comb member 28 comprises a support plate 30 from which there project two rows of teeth 31 of frusto-conical shape with rounded ends.

The two arms 26, 27 are hinged at their ends on diametrically opposed pins 32 provided on a ring 33 rigid with a cylinder 34. At their upper ends 35, the arms 26, 27 support, on pins 36, rollers 37 guided in J-shaped slots 38 provided in a pair of vertical parallel plates 39 supported by one of the hopper walls.

The cylinder 34 forms part of a double acting cylinder-piston unit controlled by compressed air, its fixed part comprising the piston 40 and the rod 41. More specifically, the rod 41 is fixed at its two ends to brackets 42 rigid with the hopper 4. As is apparent, the ends of the cylinder 34 are provided with gaskets which seal against the rod 41.

As can be seen from FIG. 1, the comb 28 is disposed downstream of the dispensing means 10 with reference to the feed direction (arrow B) of the plastic curd.

The operation of the apparatus described above is as follows:

The starting position is that shown in FIG. 1. On feeding compressed air into the bottom of the cylinder 34. The latter falls and therefore lowers the arms 26, 27. By this means, the teeth 31 of the comb 28 penetrate into the plastic curd 2, dragging with it part of the salt which has been distributed over the upper face of the plastic curd 2 by the dispensing means 10. Towards the end of its downward stroke, the comb 28 inclines forwards (as shown in FIG. 1 by dashed lines) by virtue of the special J configuration of the guide slots 38. This favours both the feed of the plastic curd and the distribution of the salt within it.

As soon as the cylinder 34 has separated from the switch 14, the valve 13 opens and compressed air reaches the tube 9. Air jets are then discharged from the tube nozzles 9A to remove the salt from the cavities 15 in the dispensing means 10.

Figure 2:
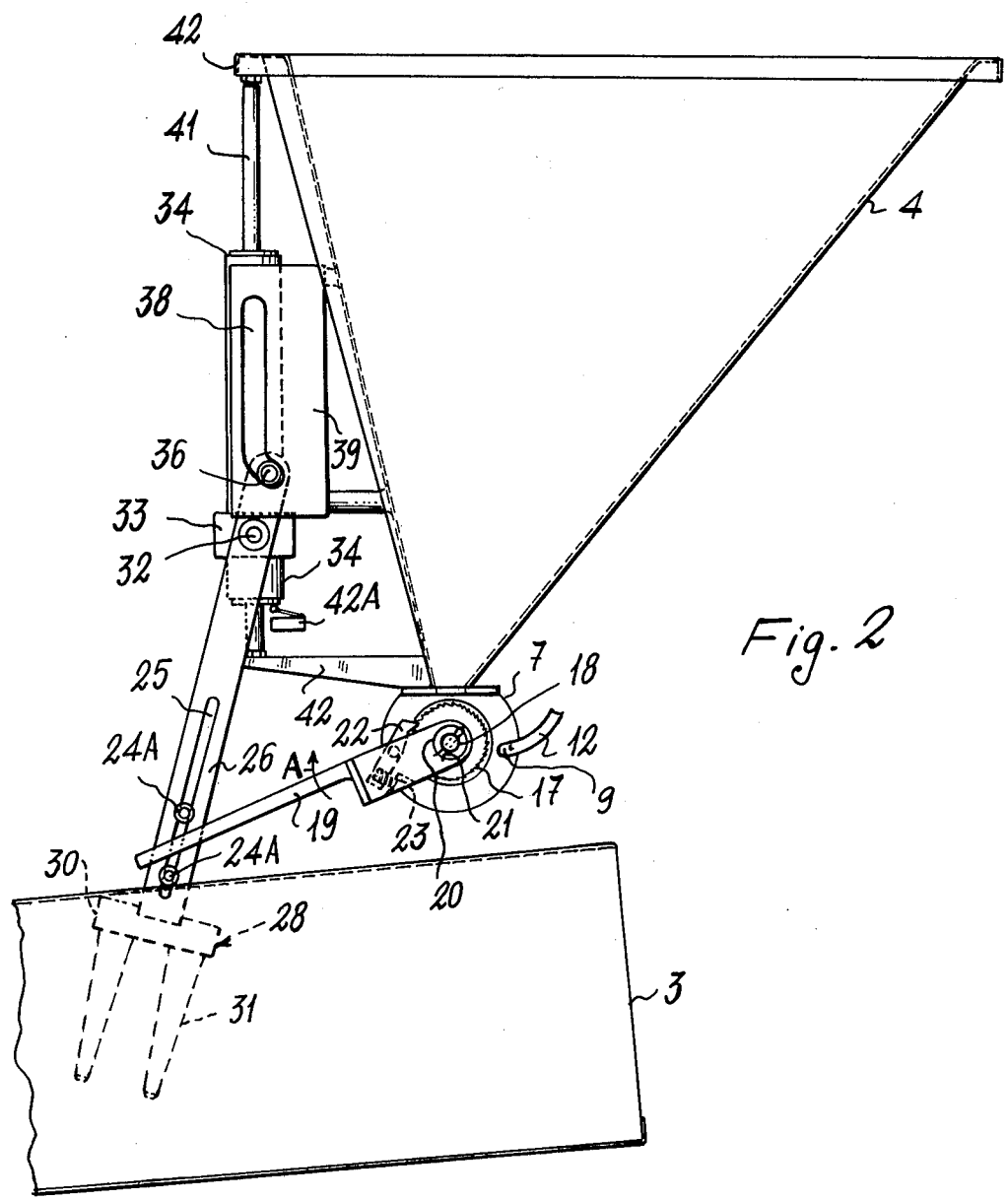
FIG. 2 is a side view of the apparatus illustrated in FIG. 1, showing the side opposite to that shown in FIG. 1.
Figure 3:
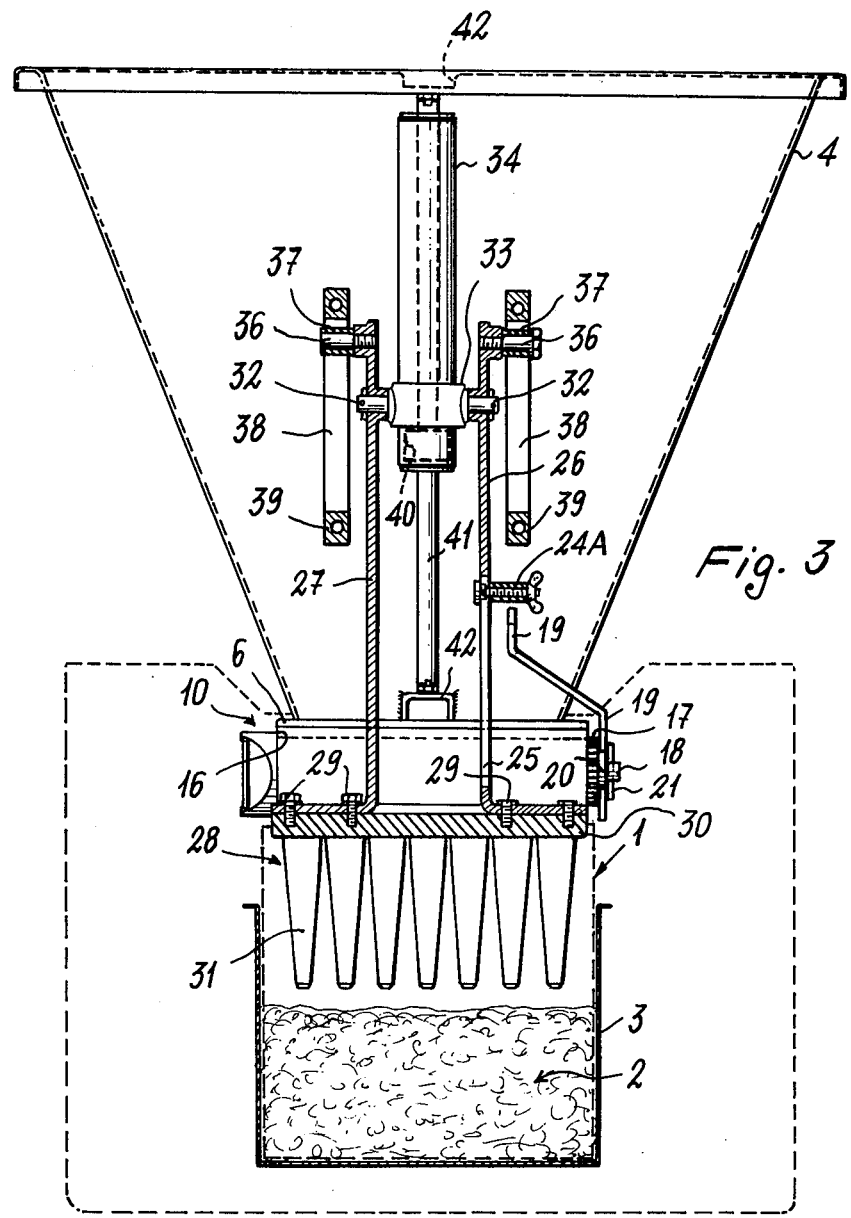
FIG. 3 is a partial section on the line III—III of FIG. 1.

When the cylinder 4 reaches its lower end-of-stroke position shown in FIG. 2, it acts on a switch 42A which causes compressed air to be fed into the top part of the cylinder, and a discharge of the compressed air from the bottom part of the cylinder. The comb 28 thus begins to rise, following a trajectory which is the reverse of that described and favours distribution of the salt within the plastic curd mass. During this rising movement, the lower pin 24A acts on the lever 19, which consequently is rotated (arrow A of FIG. 2). This rotation causes rotation of the dispensing means 10 by virtue of the engagement of the pawl 22 with the toothing 17. During the rotation of the dispensing means 10, a certain quantity of salt is transferred to the aperture 8, and removed both by gravity and by the effect of the air jets from the tube 9.

The comb 28 rises from the plastic curd 2, and when the piston 34 reaches its end-of-stroke position, it engages the switch 14, with the result that the valve 13 closes and compressed air delivery to the tube 9 ceases.

The apparatus can either remain in this position while awaiting a command from the operator, or the cycle can recommence and repeat automatically until the operator halts the apparatus by acting on a main switch. In this case, the limit switches 14 and 14A act on an electromagnetic slide valve or a similar distributor member in order to provide reciprocating motion to the cylinder 34 and thus to the comb 28 and dispensing means 10.

Although only one embodiment of the invention has been described, numerous modifications will be apparent to those skilled the art on the basis of the inventive idea, without departing from the scope of the invention.

What is claimed is:

1. Apparatus for use in the production of cheese and, in particular, for introducing salt into and mixing salt within a mass of curd in its plastic or pliable state, comprising:
    means for conveying the plastic curd in a stream having a free surface along a path in a downstream direction;
    a hopper adapted to contain salt, said hopper having an outlet;
    means disposed at said hopper outlet for dispensing metered quantities of salt onto the free surface of the stream of plastic curd at a first upstream region along the path of movement of the curd stream as the same is being conveyed;
    a movably mounted comb member situated over a second region along the path of movement of the curd stream, said second region being located downstream of said first region; and
    means for movably driving the comb member so that the comb member penetrates the free surface of the plastic curd stream moving on said conveying means to substantially uniformly introduce the salt dispensed onto the curd stream by said dispensing means through the mass of the curd stream.

2. Apparatus as claimed in claim 1 wherein said dispensing means comprise a substantially cylindrical member situated below said hopper outlet and mounted so as to be rotatable about its axis, said cylindrical member including on its periphery a plurality of seats which receive the salt which passes through said hopper outlet, and means for generating at least one air jet which impinges against said cylinder to ensure that the salt emerges from the seats.

3. Apparatus as claimed in claim 2, wherein said substantially cylindrical member is disposed within a hollow member defined by wall means having an aperture formed therein, said means for generating the air jet being located in said aperture of said hollow member.

4. Apparatus as claimed in claim 3, wherein said aperture is directed downwards towards said first upstream region along the path of movement of the curd stream.

5. Apparatus as claimed in claim 1, wherein said comb member driving means are operatively associated with said dispensing means, whereby said driving means drives both said comb member and said dispensing means.

6. Apparatus as claimed in claim 1, wherein said comb member driving means comprise a pneumatic cylinder-piston unit including a fixed piston and piston rod and a cylinder mounted for movement, said cylinder being coupled to said comb member by coupling means.

7. Apparatus as claimed in claim 6, wherein said coupling means comprises at least one pin fixed to said cylinder for movement therewith, an elongate arm hinged to said pin, the comb member being fixed to one end of said arm, said arm being guided by guide means over a cam path which comprises a rectilinear movement and an angular movement.

8. Apparatus as claimed in claim 7 wherein said guide means comprise at least one fixed plate having a substantially J-shaped slot formed therethrough and a pin fixed to said arm extending through and being guided by said slot as said cylinder and arm are moved.

9. Apparatus as claimed in claim 7 wherein said dispensing means comprise a substantially cylindrical member situated below said hopper outlet and mounted so as to be rotatable about is axis, said cylindrical member including on its periphery a plurality of seats which receive the salt which passes through said hopper outlet, and further including ratchet and pawl means associated with said cylindrical member and lever means associated with said ratchet and pawl means for rotating said cylindrical member over a limited angular extent in one direction only upon movement of said arm.

* * * * *